United States Patent [19]

Iwata et al.

[11] 4,328,520
[45] May 4, 1982

[54] TAPE TRANSPORT DEVICE

[75] Inventors: Mitsuo Iwata; Hajime Wada; Tomoyuki Iwasa; Kunio Tsuchino, all of Tottori, Japan

[73] Assignees: Sanyo Electric Co., Ltd., Osaka; Tottori Sanyo Electric Co., Ltd., Tottori, both of Japan

[21] Appl. No.: 86,316

[22] Filed: Oct. 19, 1979

[30] Foreign Application Priority Data

Oct. 19, 1978 [JP] Japan ................ 53-130192

[51] Int. Cl.³ .............. G11B 15/44; G11B 15/46; G11B 15/10
[52] U.S. Cl. .................. 360/73; 360/74.4; 360/96.3; 360/105
[58] Field of Search ............ 360/73, 105, 96.3, 72.2, 360/74.4, 92–93, 60, 62, 96.4; 179/100.1 PS, 100.1 VC, 100.1 TC; 242/206–210

[56] References Cited

U.S. PATENT DOCUMENTS

| | | | |
|---|---|---|---|
| 3,638,952 | 2/1972 | Ban | 360/73 |
| 3,665,117 | 4/1972 | Staar | 179/100.1 PS |
| 3,669,455 | 6/1972 | Cicatelli | 360/93 |
| 3,877,074 | 4/1975 | Guttinger | 360/96.3 |
| 3,984,869 | 10/1976 | Fujii et al. | 360/73 |
| 4,014,041 | 3/1977 | Cicatelli | 360/96.4 |
| 4,118,745 | 10/1978 | Matsuura et al. | 360/96.3 |
| 4,129,889 | 12/1978 | Ban et al. | 360/105 |
| 4,176,383 | 11/1979 | Suzuki | 360/105 |
| 4,212,040 | 7/1980 | Yoshida et al. | 360/105 |

Primary Examiner—Alfred H. Eddleman
Attorney, Agent, or Firm—Armstrong, Nikaido, Marmelstein & Kubovcik

[57] ABSTRACT

A tape transport is disclosed and claimed for moving recorded tape that contains both recorded sections and non-recorded sections between a loaded reel and a takeup reel. The transport is adapted for both the normal play, fast forward, and rewind modes and for an additional two modes, detecting fast forward and detecting rewind, in which the tape moves in fast forward or rewind through a recorded section until a non-recorded section is detected, at which point the transport automatically shifts to the play mode. A selector for choosing the desired mode can be operated by a single control lever. Or a first control for choice between play, fast forward, and detecting fast forward, and a second control for choice between play, rewind, and detecting rewind can be provided.

15 Claims, 9 Drawing Figures

TAPE TRANSPORT DEVICE

BACKGROUND OF THE INVENTION

In using tape transports with fast forward and rewind operation, when the listener desires to skip a portion of the tape being played or to play back a passage of the tape which has already been played, the tape drive is shifted to move the tape much faster than the normal playing speed. One major problem with such operation of tape transports is the operator's determination of the exact point on the tape at which the transport will resume play when the high speed drive is deactivated if the listener must use a hit and miss technique.

In recent years tape transports with cartridge and cassette type tapes that can be loaded simply by introducing the cartridge or cassette into a loading recess have appeared, often for use with prerecorded tapes, which have extended the use of tape transports to vehicles and other activities in which more extensive manipulations than mere loading cannot be allowed to distract the operator's attention from a main activity, such as driving a vehicle.

Various methods have been tried for overcoming the uncertainty and difficulty of stopping fast tape movement. For example, to assist the operator, U.S. Pat. No. 3,665,117, Staar, discloses a device having a detecting circuit which automatically stops the fast forward run or rewind of the tape in the non-recorded sections that often precede recorded sections to be played back, while simultaneously bringing the normal playback mode back into operation.

However, operators will be greatly assisted if a more simplified device than Staar's is available which operates with the same controls already present for normal fast forward and rewind, while preserving the option of normal fast forward and rewind; fewer controls and simpler mechanism and operation will lead to more error free enjoyment and reduce the chance of distracting the operator from a primary activity.

Therefore, it is an object of this invention to present a tape transport having manually selectable detecting fast forward and detecting rewind skip speeds manually engageable in a simple manner and operating until a non-recorded section of tape moves across the tape head.

It is a further object of this invention to provide for selection of normal fast forward and rewind skip speeds in addition to the option of the detecting fast forward and detecting rewind speeds.

It is yet another object of this invention to provide simplified controls for shifting between the play speed and any of the skip speeds, preferably by adapting controls already usually present for fast forward and rewind skip speeds, either of the two button type or in the form of a single control lever.

Yet another object of this invention is to effect the choice and automatic features of the detecting and normal skip speeds by a simple movable plate engageable in selective operative positions and responsive to the speed of a drive means and an input from a detecting means for distinguishing between recorded and non-recorded sections on the tape moving past the transport's tape head, the plate serving to move the tape head between play, detecting skip, and normal skip positions.

SUMMARY OF THE INVENTION

A tape transport is disclosed and claimed for moving recorded tape that contains both recorded sections and non-recorded sections between a loaded reel and a takeup reel. The transport is adapted for both the normal play, fast forward, and rewind modes and for an additional two modes, detecting fast forward and detecting rewind in which the tape moves in fast forward or rewind through a recorded section until a non-recorded section is detected, at which point the transport automatically shifts to the play mode. The transport includes a drive means for the various speeds, a selector for the fast forward modes and a selector for the rewind modes. It can be operated so that a control device moves the tape head either in full contact, slight contact, or fully away from the tape corresponding to the transport mode selected manually. A detector is used to distinguish recorded sections from non-recorded sections when the tape head is in slight contact with the tape. A locking mechanism holds the transport in the detecting fast forward or detecting rewind modes, once selected manually, until a non-recorded section is detected, at which point the locking mechanism releases the transport into the play mode. Normal fast forward and rewind can also be manually selected, locking automatically until manual release or the end of the tape. The selector can be operated by a single control lever. Or a first control for choice between play, fast forward, and detecting fast forward, and a second control for choice between play, rewind, and detecting rewind can be provided. A movable plate with five positions can be used to effect the mode selection in a simple and reliable manner. Automatic release of the locking means can be effected by an electromagnet connected to respond to the detector. The transport is particularly adapted for use in situations where the primary attention of the operator is directed elsewhere, as where the operator is controlling a vehicle.

BRIEF DESCRIPTION OF THE DRAWINGS

These and other objects and features of the present invention will become apparent from the following description taken in conjunction with the preferred embodiments thereof with reference to the accompanying drawings, in which.

In the Figures, unless otherwise indicated, the same or analogous parts have been labeled with the same numerals.

DESCRIPTION OF THE PREFERRED EMBODIMENTS

It will be readily apparent to those skilled in the art that the invention is applicable to a great variety of tape transports, for example both reel to reel devices and cartridges and cassettes. Also there are many possible types of tape materials, tape heads and recording methods that could employ the invention. Although a wide variety of embodiments therefore come within the invention, for simplification of the description the invention will be described in detail only for magnetic tape transports since these transports currently enjoy wide application and great familiarity.

Figure 1:
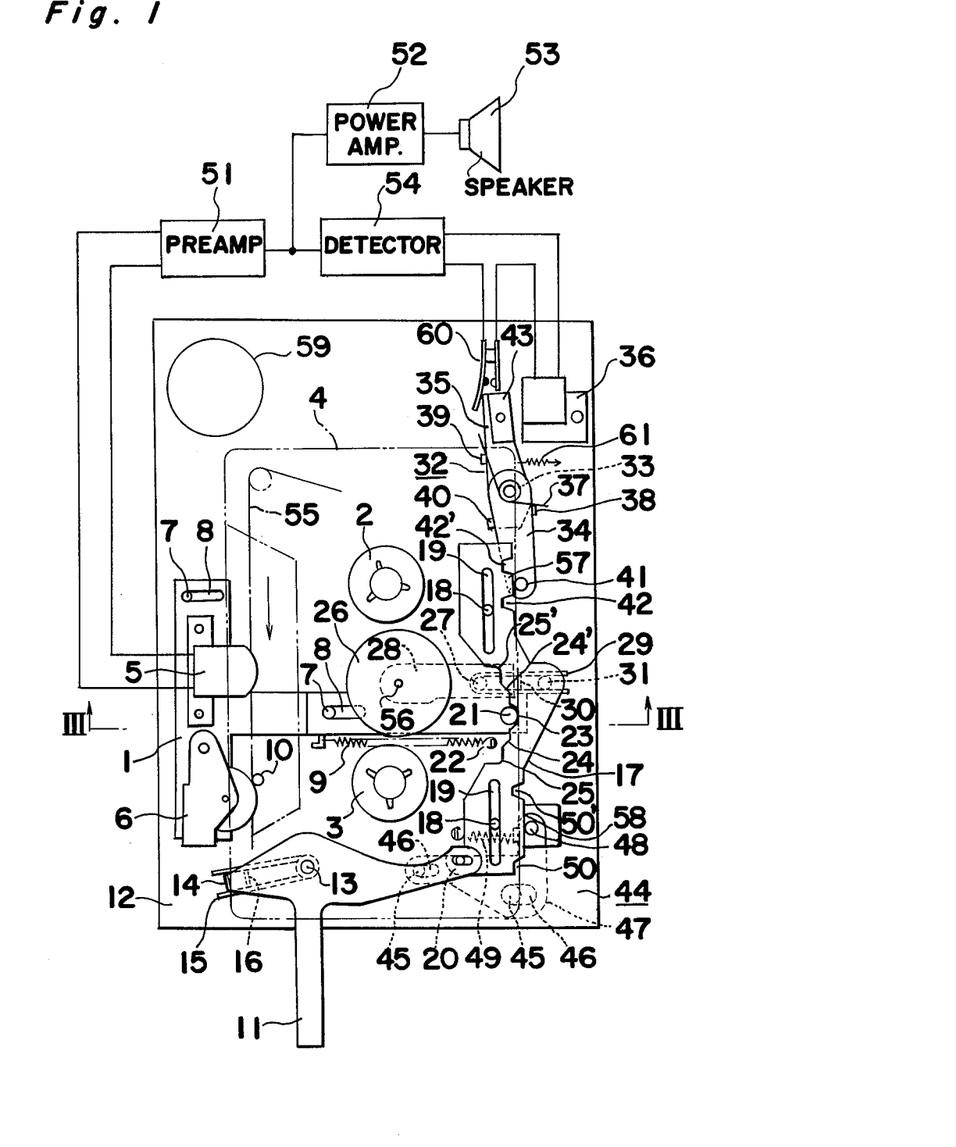
FIG. 1 is a top plan view of a first embodiment of our invention for tape cassettes showing it in the condition for moving at the play speed.
Figure 2:
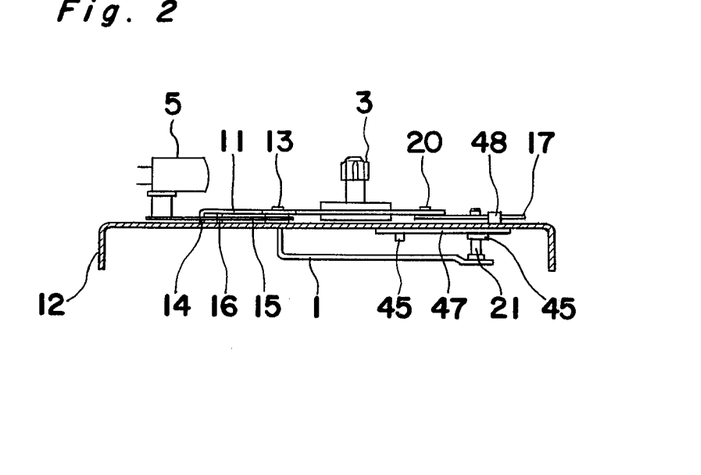
FIG. 2 is a front end view of the embodiment of FIG. 1.

FIG. 1 shows a top plan view of such a cassette embodiment adapted for a cassette 4 (partially shown with dotted lines) containing conventional tape supply and takeup reels (not shown). Cassette 4 contains magnetic tape 55, only a portion of tape 55, that passing near tape head 5 being shown with dotted lines. A takeup reel axle 3 is driven, from below, by a suitable conventional drive motor 59 and linkage arrangement (not shown). And, as is also conventional, the linkage arrangement is the kind that will, from below, drive takeup reel axle 3 (and hence the corresponding cassette takeup reel) at the play speed when these axles 2 and 3 are held separate from idler wheel 26 and when cassette 4 is loaded and tape head 5 is held against tape 55 as in FIG. 1.

Figure 3:
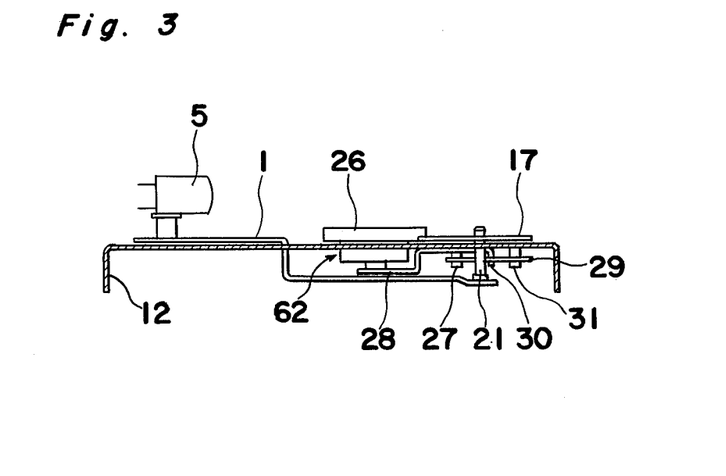
FIG. 3 is a cross-sectional view along III—III in FIG. 1.

Idler wheel 26 is rotatably mounted on an idler wheel pin 56 carried by a movable plate 28, plate 28 being rotatably mounted on an axis pin 27 extending from chassis 12. Plate 28 is spring loaded by a hairpin spring 29 also mounted on pin 27 with its central portion associtating with bent edge 30 of plate 28 and its free ends associating with pin projection 31 of a cam plate 17. Thus upward motion of plate 17 from its central play position causes plate 28 and idler wheel 26 to move towards axle 3 (see FIG. 4). Downward motion of cam plate 17 from its central play position causes plate 28 and idler wheel 26 to move towards axle 2 (See FIG. 5). In a conventional manner, the linkage arrangement (not shown) to drive motor 59 is arranged to drive idler wheel 26 on its underside as at 62 in FIG. 3 in the clockwise direction when it moves close to takeup axle 3 (See FIGS. 4 and 6) and in the counterclockwise direction when it moves close to supply reel axle 2 (See FIGS. 5 and 7). Idler wheel 26 remains undriven when in the central play position (See FIG. 1).

When control lever 11 is in "play" as in FIG. 1 and cassette 4 has been inserted to start play, a hairpin spring 15, with its free ends associating with bent end 14 on a control lever 11 and an upright edge 16 on a chassis 12, biases lever 11 in play. So a cam plate 17 guided by a pin 18 extending from the chassis 12 in a groove 19 in plate 17 is held in its play position. Then a pin 21 on a T-shaped head support plate 1 is engaged in a central recess 23 of a multiply notched cam edge 22 on cam plate 17 and at the same time the movable plate 28 rotatably mounted on axis pin 27 extending from chassis 12 is biased in its central play position.

Spring 29's central portion associates with a bent edge 30 on plate 28 while its free ends associate with a downward pin projection 31 on cam plate 17. Thus idler wheel 26 is between axles 2 and 3 and disengaged from axles 2 and 3. When cam plate 17 is centralized, a pin 41 on a first lever 34 and a pin 48 projecting from a plate 47 of a first 32 and a second 44 holding device respectively are in contact with respective flat edges 57 and 58 of plate 17. Plate 47 has two slots 46 for receiving guide pins 45 extending from chassis 12. When skipping a recorded section is desired, control lever 11 is turned counterclockwise with a relatively small stroke about a pin 13 mounted on chassis 12 as in FIG. 4 for moving cam plate 17 upwards, thereupon plate 28 rotates counterclockwise about axis pin 27 against hairpin spring 29, and idler wheel 26 is then driven clockwise and engages takeup axle 3. Then guide pin 21 enters a first recess 24 in plate 17, thus T-shaped support plate 1 supporting head 5 moves against a spring 9, extending between plate 1 and chassis to bias plate 1 towards cassette 4, to move the head 5 away from tape 55, but not so far as to eliminate contact and detection, and a pinch roller 6 mounted on head support plate 1 is moved away from a capstan 10. Note that the motion of plate 1 is restricted by the cooperation of an elongated groove 8 and pins 7 extending from chassis 12. Therefore tape 55 is in contact with and moves past head 5 at high speed for winding the tape on the reel driven by takeup reel axle 3. During this operation pin 41 of first holding device 32 is engaged with a recess 42 of plate 17 so that a magnetizable armature 43 is attracted into contact with electromagnet 36 mounted to chassis 12.

Thereafter, even if control lever 11 is released, it remains held in the above described position. Thus when a segment of recorded music is passing over tape head 5, electromagnet 36 is maintained in an energized state by a conventional non-recorded tape section detector 54 which receives input from a preamp 51 connected to both detector 54 and power amplifier 52 which drives a loudspeaker 53 in response to the recorded signal on the tape. Although plate 17 is kept the held position by a first holding device 32 including lever 34, lever 35, electromagnet 36 and armature 43, it is released when a blank segment passes over the tape head 5 causing detector 54 to deenergize electromagnet 36.

The bias of hairspring 15 produces a bias through linkage on control lever 11 that is stronger than the bias of coil spring 37 whose opposite ends are connected to a projection 38 on lever 34 and a projection 39 on lever 35. Therefore lever 11 is turned clockwise to the neutral position, causing plate 17 to move downwardly until contact pin 21 once again engages central recess 23.

The return of plate 17 to "play" causes head support plate 1 to move back to the "play" position and idler wheel 26 separates from take-up reel axle 3. Note that when plate 17 is engaged with pin 41, pin 48 of the second holding device 44 which includes spring biased plate 47 is held in contact with a flat edge portion of plate 17.

Figure 5:
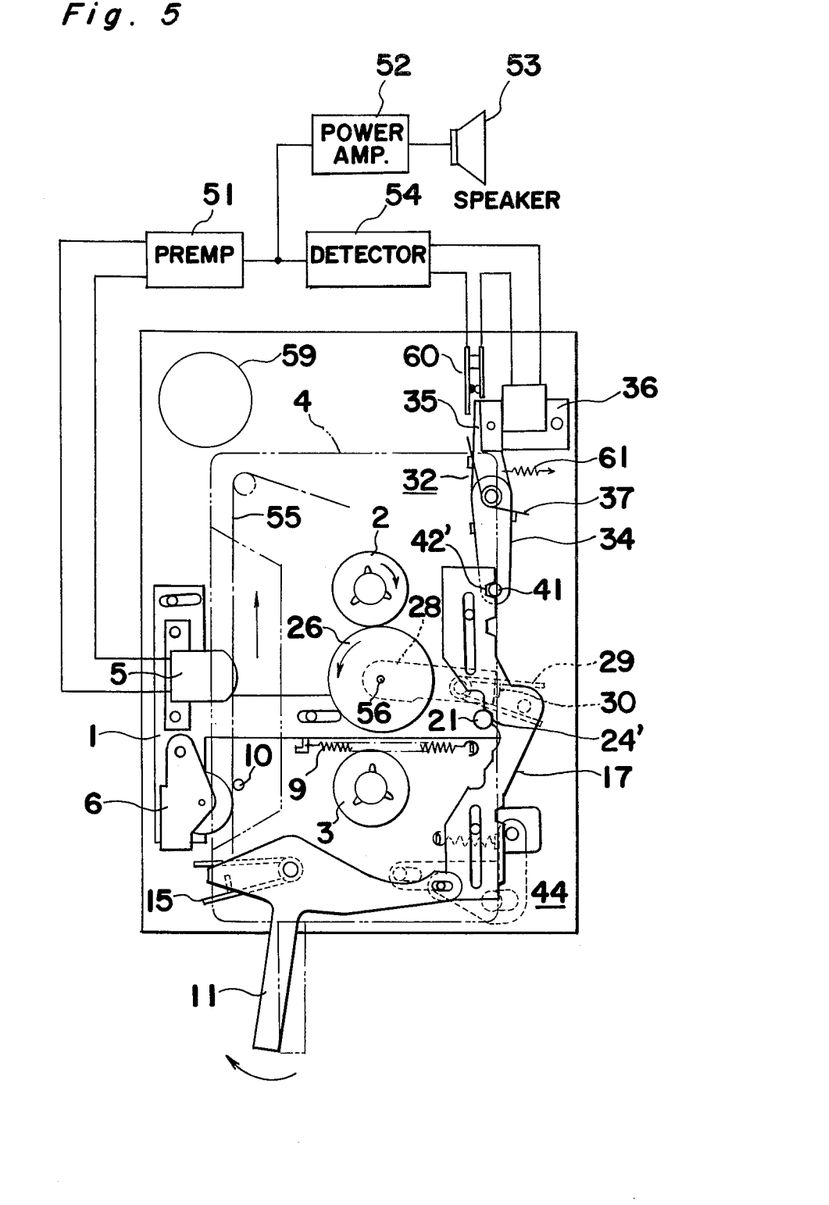
FIG. 5 is a top plan view of the first embodiment of our invention showing it in the condition for moving at the detecting rewind skip speed.

Next, the operation of rewinding to the beginning of a recorded section for replay is described. When control lever 11 is turned clockwise with a relatively small stroke as shown in FIG. 5, cam plate 17 moves downward causing counterclockwise moving idler wheel 26 to engage axle 2 and guide pin 21 to engage with a recess 24' in cam plate 17 causing head support plate 1 to partially retract from full contact with the tape 55.

Thus, tape 55 quickly rewinds on the supply reel driven by supply axle 2.

During this period the engagement between pin 41 and recess 42' in plate 17 holds lever 11 as well as plate 17 in a detecting fast forward skip speed position. Similar to the manner described above by the use of electromagnet 36, when electromagnet 36 is deenergized by detector 54, lever 11 and plate 17 are returned to the play position by the bias of hairspring 15.

When it is desired to stop the operation during the head detecting period, control lever 11 is forcibly moved to the play position pulling plate 17 down to the play position. Accordingly, pin 41 drops out of recess 42 to rotate first lever 34 about projection 33. Thereupon second lever 35, held together in a clockwise direction with lever 34 but able to move counterclockwise towards lever 34 against spring 37, is rotated about axis 33 extending from chassis 12 counterclockwise, resulting in its disengagement from the electromagnet 36.

Figure 6:
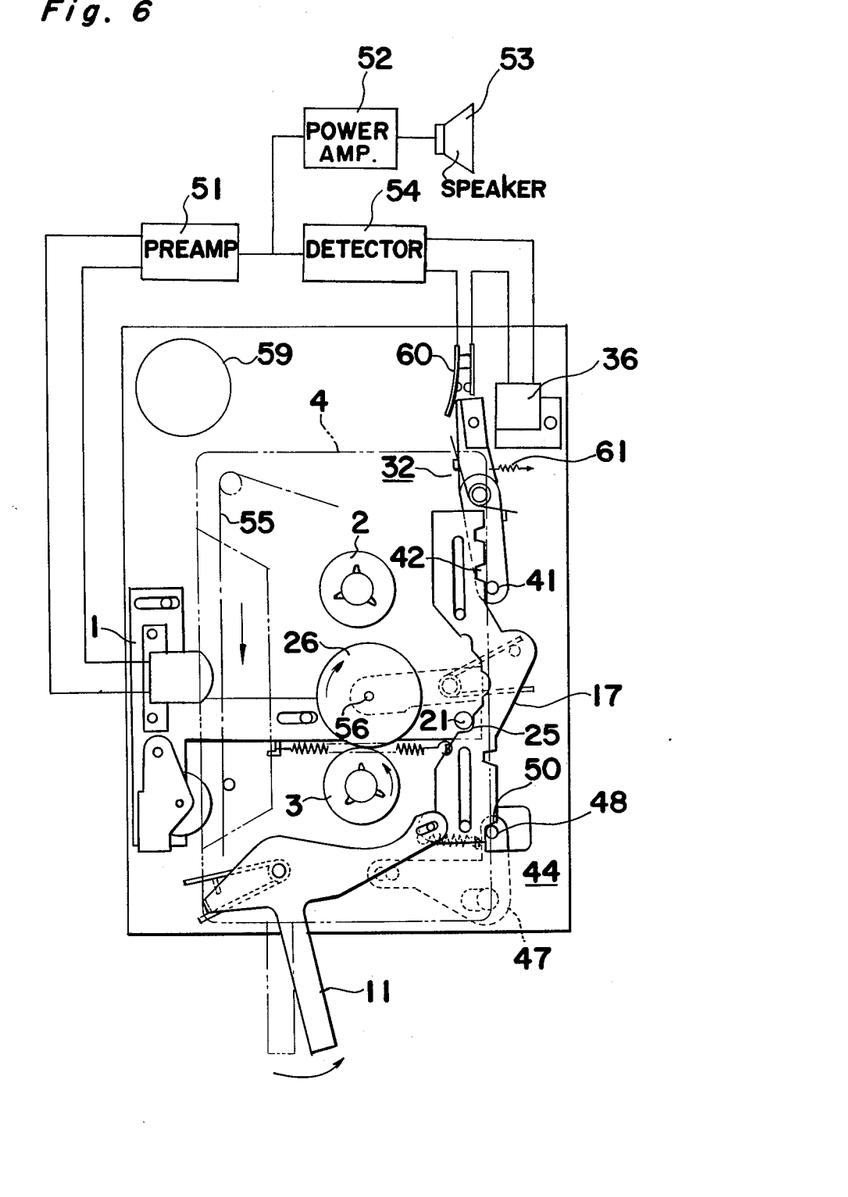
FIG. 6 is a top plan view of the first embodiment of our invention showing it in the condition for moving at the normal fast forward skip speed.

Next operation for normal fast forward skip speed and normal rewind skip speed is described. When fast forward skip speed is desired, lever 11 is rotated counterclockwise with a relatively small stroke as shown in FIG. 6 in which plate 17 is further raised upward to engage recess 50 in plate 17 with pin 48. Accordingly, idler wheel 26 is engaged with axle 3 and pin 21 is engaged with recess 25 in cam plate 17. In this position head 5 is completely withdrawn from contact with tape 55 and the tape 55 quickly winds up on the takeup reel driven by axle 3. In the above described position, pin 41 of first lever 34 is released from recess 42 and is held in contact with the flat edge 57 of plate 17.

Figure 7:
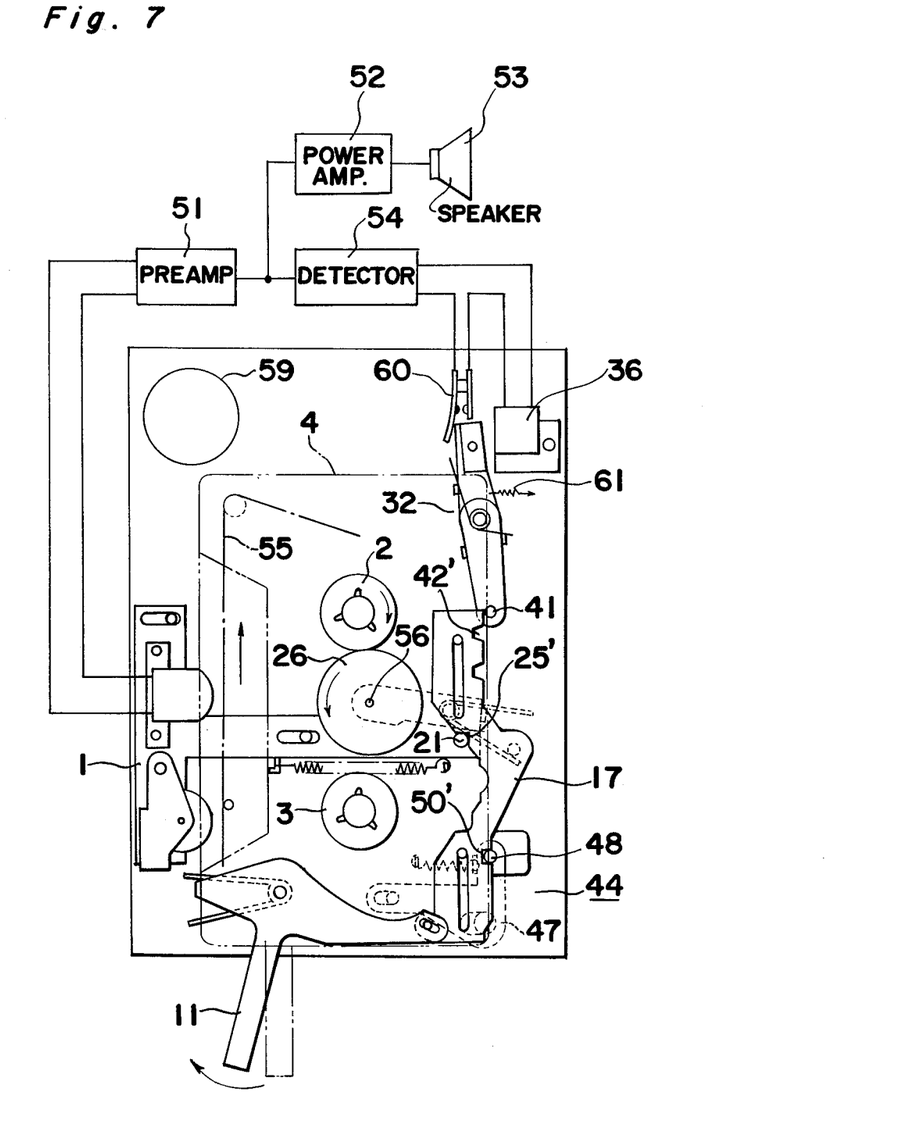
FIG. 7 is a top plan view of the first embodiment of our invention showing it in the position for moving at the normal rewind skip speed.

On the other hand, when normal rewind skip speed is desired, control lever 11 is rotated clockwise as shown in FIG. 7, causing counterclockwise moving idler wheel 26 to engage axle 2. In this position, pin 21 on head support plate 1 is engaged with recess 50' of cam plate 17. Thus tape 55 quickly rewinds up on the cassette reel driven by supply axle 2. Release of normal fast forward skip or normal rewind skip is effected by forcible manual return of control lever 11 to the play position since recess 50 or 50' of cam plate 17 is shaped to allow pin 48 of plate 47 to slidingly disengage when guide pin 20 on cam plate 17 is forcefully pulled down or pushed up by control lever 11.

Although not shown in the drawings, the conventional tape end stop features where reaching the tape end or operating an eject button is designed to cause release of normal fast forward skip or normal rewind skip may be added as desired.

Figure 9:
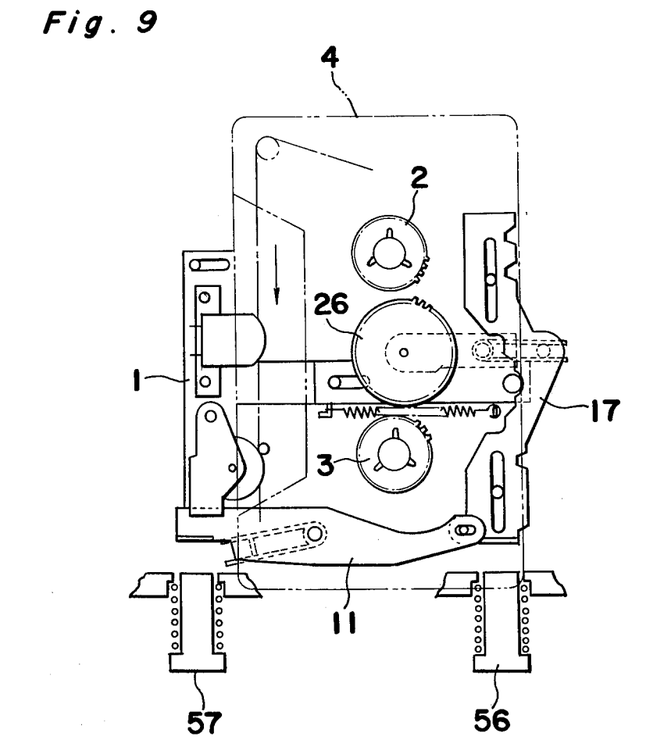
FIG. 9 is a partial top plan view of further embodiments of our invention in the play position showing sufficient details for comparison with the first embodiment shown in FIG. 1.

FIG. 9 shows another possible embodiment in which axles 2 and 3 and idler wheel 26 are geared to mesh upon engagement. Also lever 11 may be replaced by a pair of pushbuttons 56 and 57, provided for controlling fast forward skip and rewind skip operations respectively. Button 56 is a dual operating button adapted so that partial insertion directly pushes plate 17 into detecting fast forward skip position, while further insertion directly pushes plate 17 to the normal fast forward skip position. Likewise, pushbutton 57 is also a dual operating button; partial insertion pushes on a modified plate 11 which forces plate 17 into the detecting rewind skip position, while the further insertion of pushbutton 57 brings plate 17 to the normal rewind skip position. Thus button 56 directly operates on lever 17 and button 57 operates on plate 17 through force applied to one end of modified lever 11.

Figure 8:
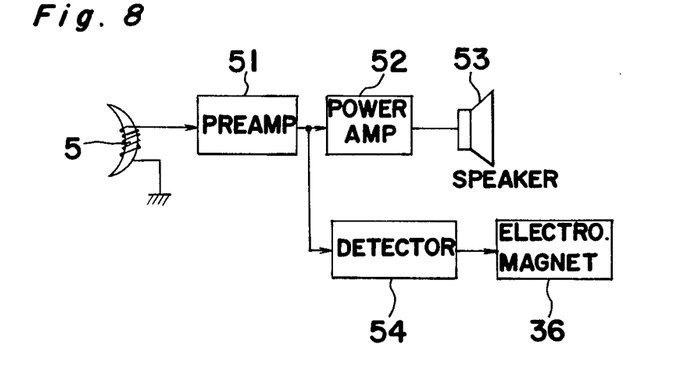
FIG. 8 is a circuit block diagram of the detector for distinguishing non-recorded section from the recorded section of tape passing the tape head.

It will be readily understood by these skilled in the art that to hear the recorded section on tape 55 during play, the recorded signal picked up by tape head 5 can be fed to preamplifier 51 which can in turn feed the preamplified signal to an audio power amplifier 52 which drives a speaker 53. If desired, the signal from preamp 51 can be fed to the power amplifier 52 even when the transport is in skip speed operation to give an audio cue or review as to the contents of the tape portion being skipped.

Figure 4:
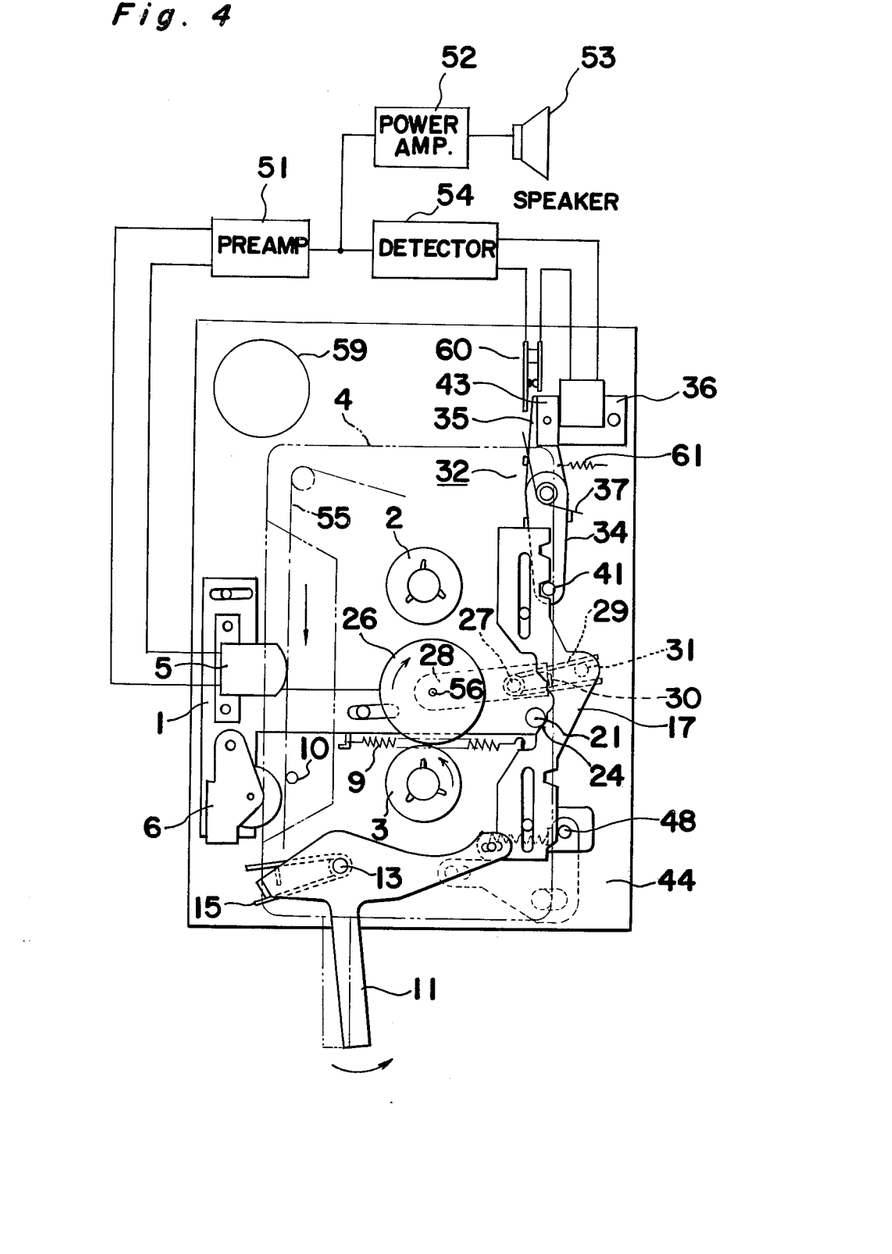
FIG. 4 is a top plan view of the first embodiment of our invention showing it in the condition for moving at the detecting fast forward skip speed.

Also since electromagnet 36 is not needed to attract the armature 43 carried by second lever 35 during play or normal skip speeds, a microswitch 60 can be provided as shown in FIG. 1 to be moved by second lever 35 to cut off electromagnet 36 during play or normal skip (FIGS. 1, 6 and 7) and to permit operation of electromagnet 36 during detecting skip (FIGS. 4 and 5). Note that a bias spring 61, attached between chassis 12 and second lever 35 gives lever 35 a clockwise bias around axis 33. But coil spring 37 on axis pin 33 is chosen so that when pin 41 of first lever 34 rests against flat edge 57 of cam plate 17, the coil spring 37's pressure on upward projection 39 of second lever 35 overcomes the bias of spring 61. Therefore second lever 35 rotates counterclockwise until stopped by the contact of an upward projection 40 on second lever 35 with the edge of first lever 34, in the process opening microswitch 60 as can be seen in FIG. 1.

Although the present invention has been fully described by means of examples with reference to the accompanying drawings, it is to be noted that various changes and modifications are apparent to those skilled in the art. Therefore, unless such changes and modifications depart from the true scope of the present invention, they should be construed as included in it.

What is claimed is:

1. A tape transport for moving a tape having a plurality of recorded sections separated by non-recorded sections, the tape transport comprising:
   (a) a tape head mounted on the transport;
   (b) a drive means for driving the tape, the drive means being shiftable between a play speed, a detecting fast forward skip speed, a fast forward normal skip speed, a detecting rewind skip speed and a normal rewind skip speed;
   (c) a single manually operable control lever means rotatable in a first direction to actuate fast forward select means for shifting the drive means between the play speed and the fast forward skip speeds, wherein the forward skip speed is selected depending upon the degree of rotation, and rotatable in a second direction to actuate rewind select means for shifting the drive means between the play speed and the rewind skip speeds, wherein the rewind skip speed is selected depending upon the degree of rotation;
   (d) a control means, responsive to the select means, for moving the tape head to a play position where the tape head is in full contact with the tape when the drive means is in the play speed, to a detecting skip position where the tape head is in slight contact with the tape when the drive means is in one of the detecting skip speeds, and to a normal skip position where the tape head is fully withdrawn from the tape when the drive means is in one of the normal skip speeds;
   (e) detecting means, responsive to the tape head when in its detecting skip position, for distinguishing the non-recorded section from the recorded section of tape passing the tape head; and (f) lock means, responsive to the control means and detecting means,
  (1) for locking the drive means in the respective detecting skip speed and the tape head in the detecting skip position when the drive means is in one of the detecting skip speeds and the detecting means distinguishes one of the recorded sections passing the tape head, and
  (2) for shifting the drive means from the respective detecting skip speed to the play speed and moving the tape head from the detecting skip position to the play position when the drive means is in one of the detecting skip speeds and the detecting means distinguishes one of the non-recorded sections passing the tape head.

2. The tape transport of claim 1 wherein the control means includes a movable plate which is selectively movable from a central position to a first position and a second position, in response to the operation of the fast forward select means, and from the central position to a third position and a fourth position, in response to operation of the rewind select means, the movable plate being formed with a central, a first, a second, a third, and a fourth recess for engagement with a projection provided on a head support plate on which the tape head is mounted, the head support plate being adapted to have its position controlled by the position of the movable plate.

3. The tape transport of claim 2 wherein the movable plate moves from its central position in one direction toward the first and second positions, and in the opposite direction toward the third and fourth positions, the movement of the movable plate in each direction first brings the movable plate to one of two detecting skip positions associated with the tape head's detecting skip position and next to one of two normal skip positions associated with the tape head's normal skip position.

4. The tape transport of claim 3 wherein the two select means are adapted to control the movable plate and to be operated by single rotatable control lever means, the direction and amount of movement of the movable plate being determined by the respective direction and degree of rotation of the single rotatable control lever means.

5. The tape transport of claim 3 wherein the lock means for locking comprises a first lock means for locking the movable plate in one of its detecting skip positions and a second lock means for locking the movable plate in one of its normal skip positions.

6. The tape transport of claim 5 wherein the first lock means comprises means for electromagnetically locking, and the second lock means comprises means for mechanically locking.

7. The tape transport of claim 6 wherein said means for electromagnetically locking comprises a lock lever means for selectively engaging one of two engagement recesses formed in the movable plate and an attracting means for electromagnetically attracting the lock lever means to hold the movable plate in one of its detecting skip positions when the detecting means is distinguishing one of the recorded sections of tape.

8. The tape transport of claim 7 wherein the lock lever means comprises a first lever means adapted for being attracted to the attracting means and a second lever means adapted for being engaged in one of two engagement recesses, said first lever means moving together with the second lever means when the first lever means is shifted towards the attracting means and said second lever means moving independently of the first lever means when the second lever means is shifted away from the selected engagement recess.

9. In a tape transport for moving a tape, the transport having a play speed, a detecting fast forward speed, a normal fast forward speed, a detecting rewind speed and a normal rewind speed and means for retracting a tape head mounted on a support plate from a play position to a position fully away from the running tape, the improvement comprising:

a single control lever means for selecting one of said speeds and adapted to be manually rotatable in a first direction and a second direction, wherein in each direction the degree of rotation selects between a first engaged position adapted to cause a head support plate to move to an intermediate engaged position where the tape head slightly contacts the tape and operates the tape transport at the detecting fast forward speed or detecting rewind speed and a second engaged position adapted to cause the head support plate to move to a fully withdrawn position where the tape head is fully away from the tape and operates the tape transport at the normal fast forward speed or normal rewind speed.

10. A tape transport device for running a tape having a plurality of recorded sections separated by non-recorded sections, said tape transport device comprising:

(a) a head support plate movably mounted on a chassis and carrying a tape head, responsive to a cam plate, (b) drive means whose speeds and directions are selectable for driving the tape at a play speed, a fast forward speed, and a rewind speed, responsive to the cam plate, (c) manually operable selecting means including a single control lever rotatable to both the left and right from a neutral position and adapted to move the cam plate so that
  (1) when the control lever is in the neutral position the cam plate sets the drive means to play and puts the tape in complete contact with the tape head,
  (2) when the control lever is shifted from the neutral position in a short stroke to either the right or left, the cam plate respectively sets the drive means to fast forward speed or rewind speed and puts the tape in slight contact with the tape head,
  (3) when the control lever is shifted from the neutral position in a long stroke to either the right or left, the cam plate sets the drive means to fast forward or rewind and holds the tape out of contact with the tape head, (d) detecting means, responsive to the tape head, for detecting the recorded and non-recorded sections when the tape is moving in slight contact past the tape head, (e) an electrical lock means, responsive to both the detecting means and the control lever, (1) for locking the control lever in its shifted position when the control lever is shifted from the neutral position in a short stroke to either the right or left and the detecting means detects a recorded section, and (2) for releasing the control lever from the locked position and returning it to its neutral position when the detecting means detects a non-recorded section of the tape, whereby a recorded section of the tape can be skipped during fast forward or rewind and the drive means is put in play when the detecting means detects a non-recorded section.

11. A device as claimed in claim 10 further comprising a mechanical locking means for locking the control lever in its shifted position when the control lever is shifted from the neutral position in a long stroke.

12. A device as claimed in claim 10 wherein the cam plate is adapted to shift from a central position to a first or second position in response to whether the control lever is shifted in a short or long stroke to the right and to a third or fourth position from its central position by according to whether the control lever is shifted in a short or long stroke to the left and, the cam plate has a central, a first, a third, and a fourth recess provided for engagement with a projection on the tape head support plate, so that, in accordance with the cam position the head support plate takes one of three different positions.

13. A device as in claim 12 wherein the cam plate is connected with the drive means by a hairpin spring.

14. A device as in claim 10 wherein the electrically locking means comprises a lock lever means selectively engagable with one of two grooves provided in the cam plate and attractive means, responsive to the detecting means, for electromagnetically attracting the lock lever means to engage in one of the grooves in the cam plate when the detecting means detects a recorded section in the tape.

15. A device as claimed in claim 14 wherein the lock lever means comprises a first lever adapted to be attracted by the attracting means and a second lever adapted to be engagable, one at a time, with two lock grooves of the cam plate, the first lever being moved together with the second lever when the first lever is attracted by the attracting means and the second lever being movable independently of the first lever when the second lever is not engaged with either lock groove of the cam plate.

* * * * *